United States Patent
Johnston

[15] 3,684,050
[45] Aug. 15, 1972

[54] METHOD AND APPARATUS FOR ACOUSTIC ENERGY GENERATION IN MARINE EXPLORATION

[72] Inventor: Roy C. Johnston, Richardson, Tex.
[73] Assignee: Texas Instruments Incorporated, Dallas, Tex.
[22] Filed: Jan. 2, 1970
[21] Appl. No.: 35

[52] U.S. Cl.............181/.5 H, 340/7 R, 340/15, 340/17
[51] Int. Cl. ...............................G01v 1/38
[58] Field of Search...340/12, 15; 181/.5 AG, .5 VM, 181/.5 H

[56] References Cited

UNITED STATES PATENTS

| | | | |
|---|---|---|---|
| 2,395,862 | 3/1946 | Freeman et al.............340/12 |
| 3,536,157 | 10/1970 | Anstry.....................181/.5 H |
| 2,792,804 | 5/1957 | Bouyoucos et al....340/12 UX |
| 2,977,705 | 4/1961 | Busnel.........................340/12 |
| 3,073,054 | 1/1963 | Sherwood....................340/12 |
| 2,853,826 | 9/1958 | Romeo................340/12 UX |
| 2,647,846 | 8/1953 | Bagno..................340/12 UX |
| 2,967,048 | 1/1961 | Fontaine....................181/.5 H |
| 3,496,526 | 2/1970 | Rockwell...................340/7 R |

*Primary Examiner*—Benjamin A. Borchelt
*Assistant Examiner*—N. Moskowitz
*Attorney*—James O. Dixon, Andrew M. Hassell, Harold Levine, Rene E. Grossman, Melvin Sharp and Richards, Harris & Hubbard

[57] ABSTRACT

The invention is directed to structural bodies adapted to be towed through water by a seismic exploration vessel. Physical characteristics of the body are varied between a first mode wherein a relatively sharp discontinuity occurs in the velocity of water passing over the structural body and a second mode wherein the relatively sharp discontinuity is reduced. Various embodiments include varying the physical orientation of the body with respect to the direction of towing, varying the degree of resiliency of the towed body, varying the speed of towing of the body through the water, and varying the dimensional size of the body during towing.

16 Claims, 21 Drawing Figures

PATENTED AUG 15 1972

INVENTOR
ROY C. JOHNSTON

INVENTOR
ROY C. JOHNSTON

INVENTOR
ROY C. JOHNSTON

INVENTOR
ROY C. JOHNSTON

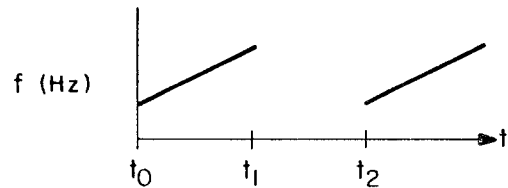
FIG. 16a
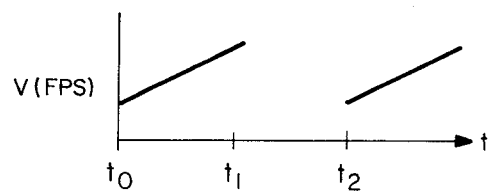
FIG. 16b
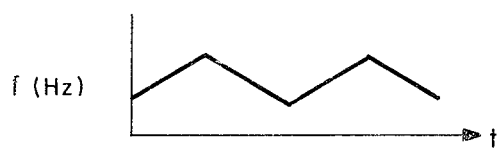
FIG. 19a
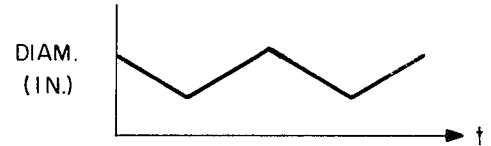
FIG. 19b
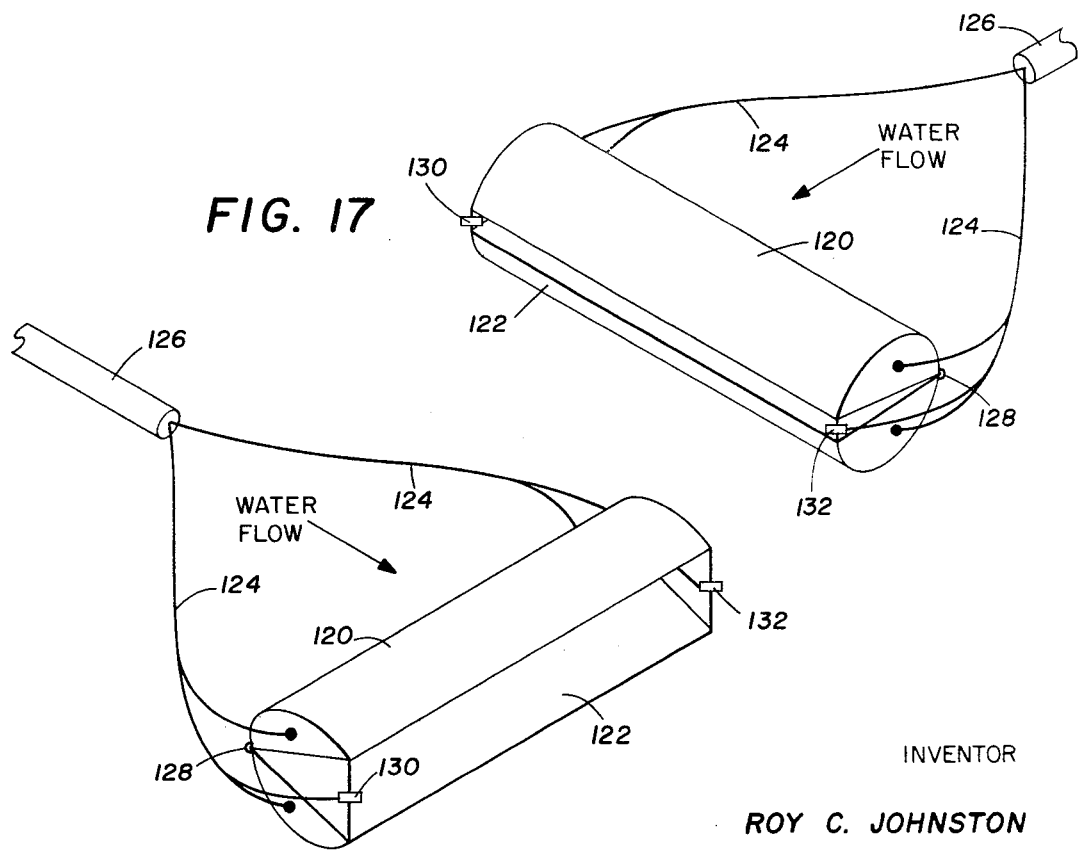
FIG. 17
FIG. 18
INVENTOR
ROY C. JOHNSTON

METHOD AND APPARATUS FOR ACOUSTIC ENERGY GENERATION IN MARINE EXPLORATION

This invention relates to the generation of acoustic signals, and more particularly to the generation of acoustic waves for use in marine seismic exploration and prospecting.

It is common practice in marine seismic exploration to generate a series of acoustic waves and then to receive the reflections and refractions of the waves in order to detect useful information about the ocean floor substrata. A wide variety of acoustic sources have heretofore been developed, but each of the previously developed sources have in common the fact that energy is stored within the source by some technique prior to actuation of the source. This storage of energy applies to the use of dynamite as an acoustic source, and also applies to the use of various mechanical vibrators, air guns and gas detonation devices commonly used for acoustic sources. All of these prior techniques thus have the common problems of replenishing the source of energy, of transporting the energy to a location remote from the prospecting vessel, and of possibly isolating the vessel from vibration caused by actuation of the source.

It is an object of the present invention to provide an acoustic energy source which does not depend upon stored energy within the source apparatus, but which makes use of an existing source of energy always present during a marine exploration survey by utilizing the motion of the marine seismic exploration vessel through the water. The present invention thus converts the kinetic energy of the vessel's motion through the water to generate useful seismic energy.

In accordance with the present invention, a relatively rigid structural body, that is, a body which has a natural frequency relatively high compared to the useful seismic frequency band, is towed through the water. Structure is provided to vary a physical characteristic of the body between a first mode wherein a relatively sharp discontinuity occurs in the velocity of water passing over the structural body and a second mode wherein the relatively sharp discontinuity is greatly reduced.

In accordance with a more specific aspect of the invention, water passageways are defined through a structural body which is towed underwater by a seismic marine vessel. Structure is provided to vary the orientation of the water passageways with respect to the direction of towing of the body. Substantially no acoustic waves are thus generated when the passageways are generally parallel to the direction of towing. Acoustic waves of significant magnitude are generated when the passageways are obliquely disposed with respect to the direction of towing, due to discontinuities in the velocity of the water which are thereby introduced. Resilient structure may be connected to the structural body and tuned to increase the magnitude of acoustic energy generated thereby.

In accordance with another aspect of the invention, a structural body is towed underwater by a marine vessel. Structure is provided to vary the dimensions of the portion of the body which faces the direction of towing. Velocity discontinuities are thereby introduced in the water in dependence upon the dimensions of the body in order to generate acoustic waves of different frequencies.

In accordance with yet another aspect of the invention, a structural body is towed underwater by a marine seismic vessel. Relatively sharp discontinuities in the velocity of the water passing across the body are introduced in order to generate acoustic waves. Structure is provided to vary the speed of towing of the body underwater in order to vary the frequency of the generated seismic waves.

For a more complete understanding of the present invention, and for further objects and advantages thereof, reference may now be made to the following description taken in conjunction with the accompanying drawings in which.

Figure 15:
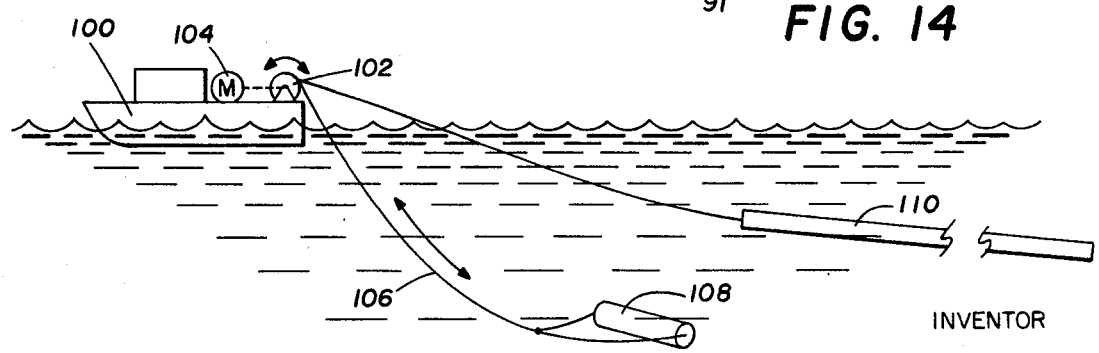
FIG. 15 is a diagrammatic illustration of the operation of a third embodiment of the invention.

FIGS. 16a–b illustrate the variance in frequency and towing velocity of the source shown in FIG. 15;

FIG. 17 is a diagrammatic illustration of the fourth embodiment of the invention in a first operational mode;

FIG. 18 is a diagrammatic illustration of the source shown in FIG. 17 in a second mode of operation; and FIGS. 19a–b are illustrations of the variance of the frequency of acoustic energy generated by the source shown in FIGS. 17 and 18 in various operational modes.

Figure 1:
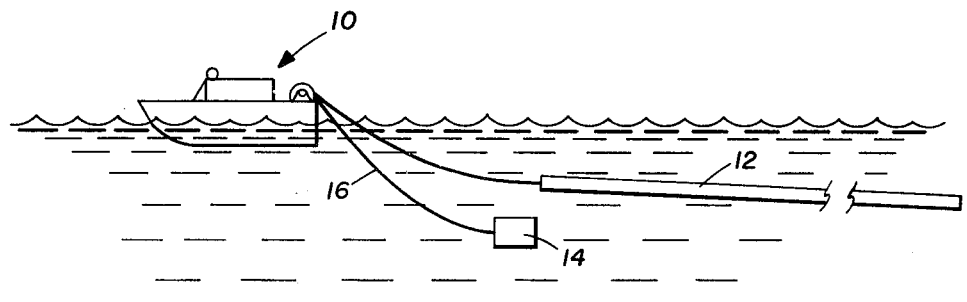
FIG. 1 is a diagrammatic illustration of a typical exploration system utilizing the invention.

Referring to FIG. 1, a typical marine exploration vessel 10 streams a hydrophone cable 12 along a selected marine traverse in the conventional manner. A seismic source 14 constructed in accordance with the invention is connected by way of a cable 16 to the vessel 10 and is selectively operated in order to generate acoustic waves. Source 14 contains no stored energy source, but obtains the energy for generation of acoustic waves suitable for seismic exploration solely by the passage of the source through the water. The refractions and reflections from the generated acoustic waves are received by the hydrophones 12 and recorded by a suitable recording mechanism aboard the vessel 10 in the well known manner.

Basically, the present invention envisions the use of bodies or structures that are relatively rigid or stiff, that is, bodies or structures which have a natural frequency relatively high compared to the desired seismic frequency band. In the preferred embodiment of the invention, the bodies are shaped in such a manner that they create, in the emit modes to be subsequently described, a sharp discontinuity in the velocity profile of the water flowing over the bodies. This sharp velocity discontinuity results in a substantial pressure gradient occurring on the rear side of the bodies, thereby causing vortices of water to act on the body to thereby emit pressure waves into the water. In the "non-emit" mode of operation, the bodies are oriented such that the velocity discontinuity of the water is reduced, that is, no vortices, to thereby reduce the generated acoustic energy.

Figure 2:
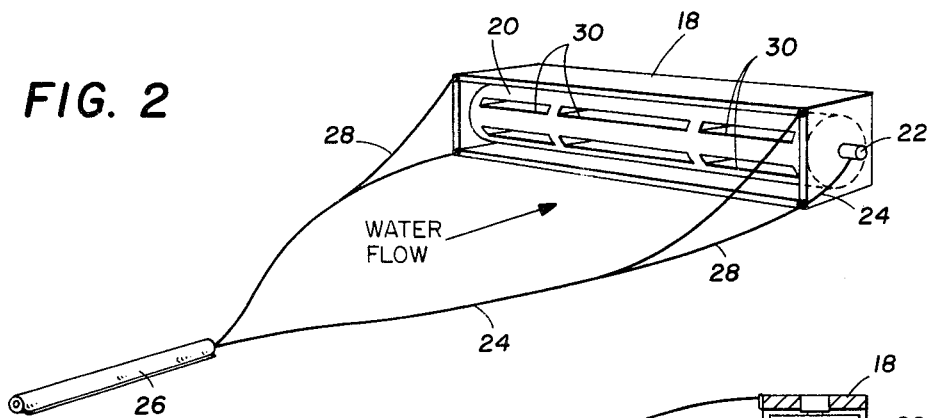
FIG. 2 is a perspective view of a first embodiment of the invention in the non-emit mode.
Figure 3:
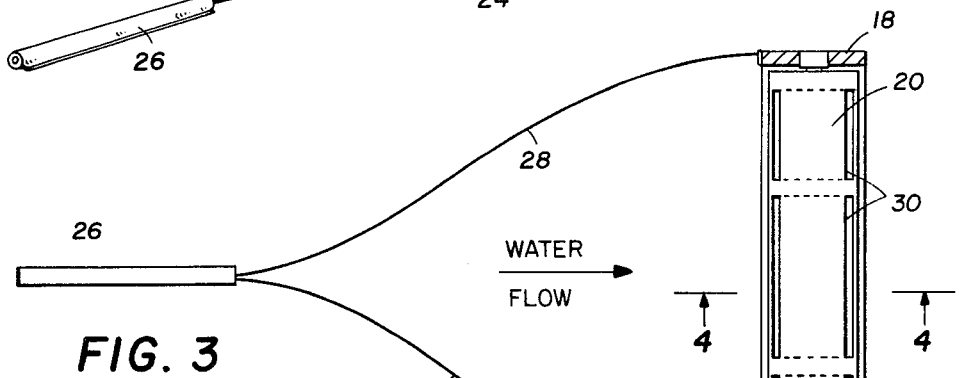
FIG. 3 is a top view of the apparatus shown in FIG. 2.

FIGS. 2–9 illustrate a first embodiment of the invention in both emit and non-emit operational modes. FIGS. 2 and 3 illustrate a generally rectangular housing 18 with open front and rear sides for water to flow through. A cylindrical member 20 is mounted within the housing 18 and is adapted to be rotated about its center axis with respect to the housing 18. A reversible electric motor 22 is mounted on the housing 18 and includes a shaft which extends into the member 20. Wires 24 extend from the motor 22 and into the tow cable 26 for connection to a suitable source of power located aboard the vessel 10. A flexible tow yoke 28 is connected between the housing 18 and the tow cable 26. The cross section of the tow cable 26 is preferably faired, as illustrated, in order to reduce the generation of noise due to the pulling of the tow cable 26 through the water.

Water passageways 30 extend through the cylinder member 20. The cylindrical member is relatively thin-walled and is sealed from water intrusion except for the water passageways extending therethrough. The housing 18 is of the same order weight as the cylindrical member. Generally, the housing in the cylindrical member will be comprised of corrosion resistant material such as metal or the like. The shape of the passageways may vary with different applications, but in the preferred embodiment comprises slots having generally rectangular cross sections and having dimensions large enough to pass a sufficient quantity of water to eliminate velocity discontinuities in the water. For example, referring to FIG. 4, the member 20 is shown in the non-emit position. Water flows through the housing 18 and passes both over the cylinder member 20 and through the passageways 30. A velocity discontinuity in the water passing over the cylinder member 20 is prevented from occurring, due to the passage of the water through the passageways 30 which makes the cylinder member 20 appear to be a streamlined foil to the external flow of water.

Figure 4:
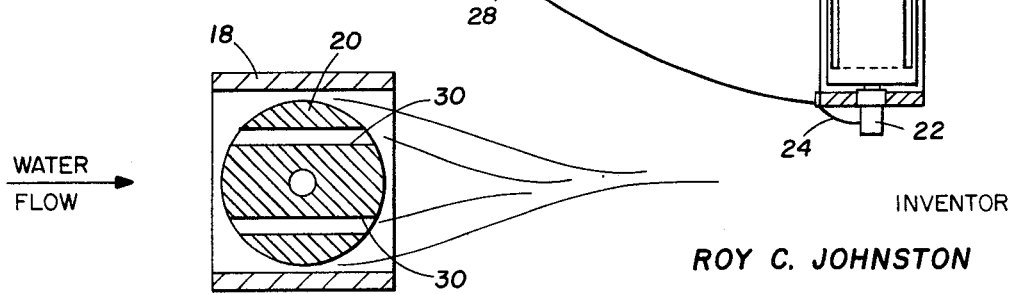
FIG. 4 is a side sectional view of the apparatus shown in FIG. 2 taken along the section lines 4—4.
Figure 5:
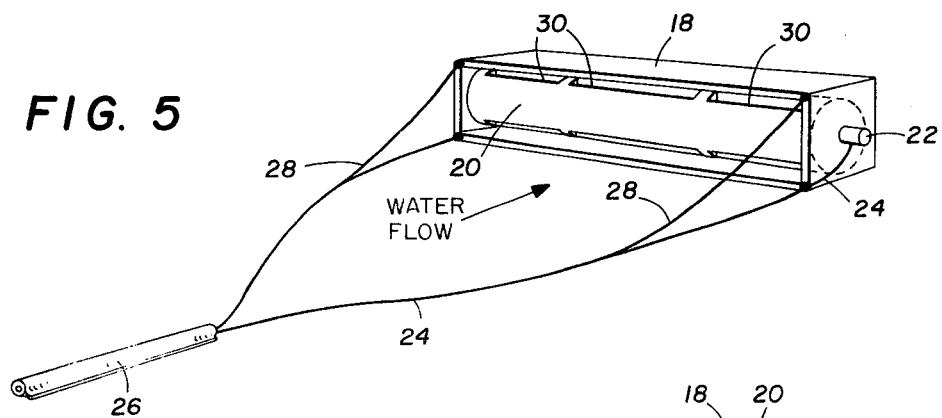
FIG. 5 is a perspective view of the apparatus shown in FIG. 2 in the emit mode.
Figure 6:
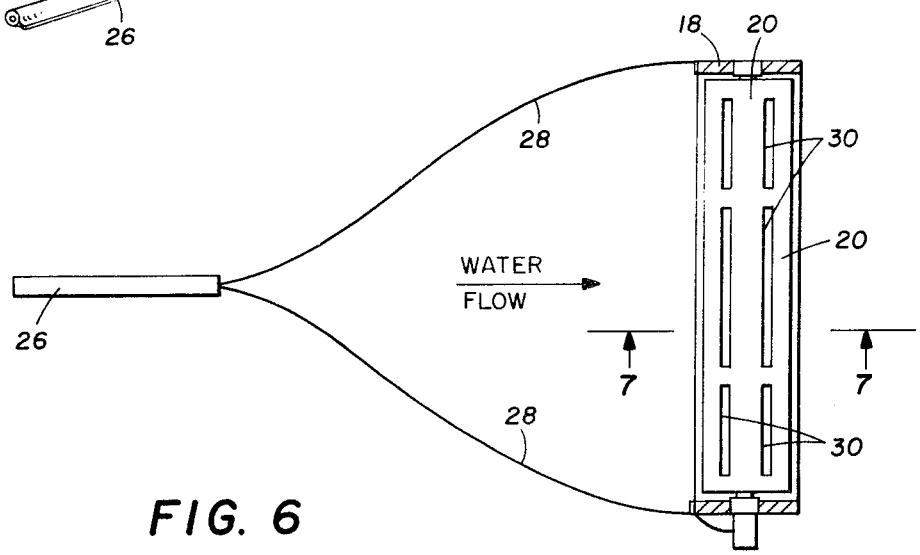
FIG. 6 is a top sectional view of the apparatus shown in FIG. 5.
Figure 7:
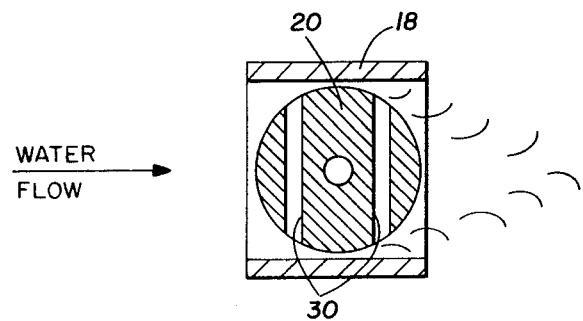
FIG. 7 is a side sectional view of the apparatus shown in FIG. 5 taken generally along the section lines 7—7.

In operation of the device, the source shown in FIGS. 2–4 is towed through the water in the illustrated position until it is desired to generate an acoustic wave. The speed of the seismic vessel 10 may commonly range from 4–8 knots, but higher speeds of 10–15 knots or greater are preferred for use with the invention. An electrical signal is then applied by way of wires 24 to the electric motor 22. In response, the electric motor 22 rotates one quarter turn to thereby rotate the cylinder member 20 to the position illustrated in FIGS. 5–7. In this position, the passageways 30 extend normal to the direction of towing of the device. Substantial velocity discontinuities are thereby created in the flow of water past the cylinder member 20. Referring particularly to FIG. 7, the discontinuities in the velocity of water flow creates an unfavorable pressure gradient on the rear of the cylinder member 20. The water passing about the cylinder member 20 thus detaches from the cylinder member to create vortices which alternatively shed from the top and bottom of the cylinder member and acts on the cylinder member to emit pressure waves into the adjacent water. The frequency at which the vortices shed is given very closely by the equation:

$$f = 0.21 V/D \qquad (1)$$

wherein
$f$ = hz
$V$ = feet per second, and
$D$ = diameter of the cylinder in feet.

It will be understood that various motors or other mechanisms may be substituted for motor 22. For instance, an electrical solenoid may be attached to a lever, such that actuation of the solenoid causes movement of the lever which rotates the cylinder member 20 through the prescribed angle. In the operation of the motor 22, suitable stops may be positioned for abutment with extensions from the shaft of the motor 22, in order to limit the rotation of the motor shaft to the prescribed distance.

When it is desired to terminate generation of acoustic waves, the electric motor 22 is again actuated and caused to rotate in a reverse direction to again position the cylinder member 20 as illustrated in FIGS. 2–4.

Figure 8:
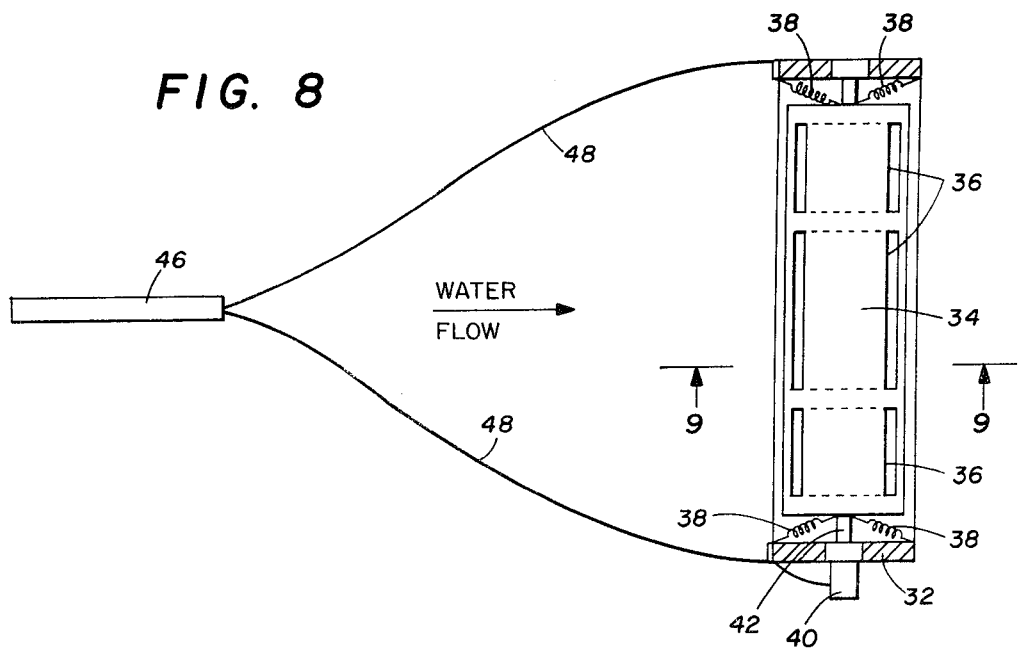
FIG. 8 is a top view of a variation of the first embodiment of the present invention.
Figure 9:
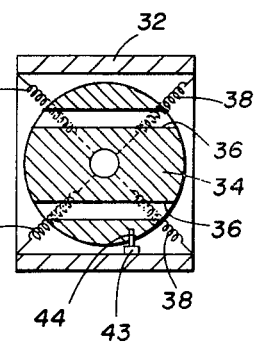
FIG. 9 is a side sectional view of the apparatus shown in FIG. 8.

FIGS. 8 and 9 illustrate an embodiment of the invention including the generally rectangular housing 32 having open front and rear sections to allow the passage of water therethrough in the manner previously described. A cylindrical member 34 is connected within housing 32 by flexible shafts. Member 34 is substantially identical to the cylindrical member shown in FIGS. 2–7, and includes water passageways 36 extending therethrough.

The cylindrical member 34 is resiliently supported from the housing 32 by means of resilient springs 38. Springs 38 are connected at one end to the housing 32 and at the other end to the longitudinal axis of the cylindrical member 34. A motor 40, which may be a reversible electrical motor, is attached to the housing 32 and includes a flexible drive shaft 42 which extends into connection with an end of the cylindrical member 34. A solenoid 43 is disposed on the housing 32 and includes a solenoid shaft 44 which may be selectively energized to extend upwardly into an aperture in the cylindrical member 34, in order to maintain the cylindrical member 34 in a stationary position. The source is towed underwater by a tow cable 46 to which is attached a flexible tow yoke 48.

An important aspect of this present embodiment is the fact that the natural frequency of the cylinder member 34 and of the resilient springs 38 is tuned to the frequency at which water vortices shed from the cylinder member according to equation (1). The natural frequency of the cylinder may be given by the equation:

$$f = (1/2\pi) \sqrt{k/m} \qquad (2)$$

wherein $k$ = elastic constant of the springs, and $m$ = the mass of the cylinder plus an apparent mass due to the motion of the cylinder through water.

The springs 38 may be installed with a sufficient resiliency to tune the cylinder member 34 for optimum efficiency for particular towing conditions. Alternatively, remotely operable means such as electric motors or solenoids may be disposed in the housing 32 to tighten or loosen the springs 38 in order to tune the natural frequency of the source during towing to thereby adjust the emitted acoustic frequency.

In operation of the source shown in FIGS. 8 and 9, when the cylinder member 34 is in the illustrated position, the solenoid shaft 44 holds the cylinder member stationary and water flows through the passageways 36 so that essentially no useful acoustic waves are generated by the passage of the source through water. However, when electrical signals are applied to the motor 40, the shaft 42 is rotated one quarter turn and the cylinder member 34 is rotated such that the passageways 36 are disposed obliquely to the direction of towing. A discontinuity thus exists in the velocity of the water passing over the cylinder member, thereby creating a pressure gradient which causes the alternate shedding of vortices from the upper and bottom portions of the cylinder in the manner previously described. The frequency of the shedding of these vortices is equal to the natural frequency of the cylinder member/spring system, that is, the frequencies given by equations (1) and (2) are equal. The vortices act upon the cylinder member which then vibrates according to its natural frequency to produce pressure waves in the water. The frequency of the pressure or acoustic waves generated in the water may be adjusted by adjusting the resiliency of the springs 38 in a manner noted.

Generally, the sources shown in FIGS. 2–9 will be operated for a prescribed period of time, as for example, 7 seconds, and will then be operated in the non-emit mode for a listening period of 7 seconds, after which another period of generation is provided.

The sources according to the invention are normally constructed to be neutrally buoyant, and in some instances may be provided with stabilizing structure such as paravanes and depth sensing devices, in order to maintain the sources at the prescribed depth.

It will be understood that a series of sources such as in FIGS. 2–9 may be towed one behind another by a single vessel, as long as the sources are spaced apart sufficiently that the vortices shed by one source will not interact with the following source. A suitable spacing for use of sources towed in this manner is about 2-½ diameters of the sources.

Figure 10:
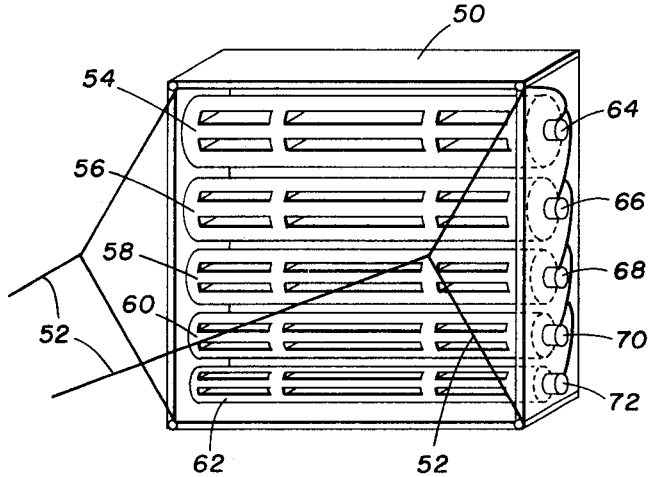
FIG. 10 is a perspective view of another variation of the first embodiment of the present invention which utilizes a plurality of sources.

FIG. 10 illustrates a variation of the invention which utilizes multiple frequency elements and which comprises a rigid housing 50 towed underwater by means of tow lines 52. A cylindrical member 54 having a relatively large diameter is disposed in the upper portion of the housing 50. Four other cylindrical members 56–62 are disposed below the cylindrical member 54, with each of the members 56–62 having sequentially smaller diameters. The lengths of each of the cylindrical members 54–62 are the same and the longitudinal axis of each of the members are parallel. Electrical motors 64–72 are respectively connected to ones of the cylindrical members and are attached to electrical wires, not shown, for selective rotation of the cylindrical members in the manner previously disclosed.

Each of the cylindrical members 54–62 has water passageways defined therethrough in the manner previously described. In the illustrated position of each of the cylindrical members, substantially no acoustic waves are generated by the source. However, when one of the cylindrical members is rotated such that the water passageways extending therethrough are obliquely disposed with respect to the direction of towing, acoustic energy having a frequency determined by the diameter of the cylindrical member is generated in accordance with equation (1).

Figure 11:
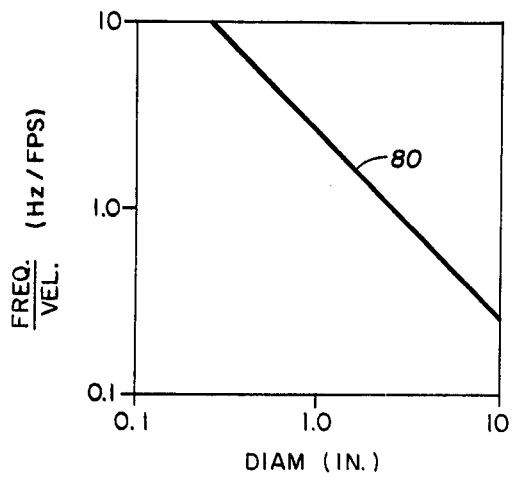
FIG. 11 is a graph illustrating the variance of frequency provided by sources of different dimensions according to the invention.

In operation of the source shown in FIG. 10, prior to the emit cycle all five of the cylindrical members 54–62 are in the non-emit mode, as illustrated. The water flowing through the water passageways thus prevents vortices from shedding from the rear of the cylindrical members. To initiate acoustic generation, cylindrical member 54 is rotated 90° and thus vortices are shed from the member at a frequency provided by equation (1). This equation is plotted by FIG. 11 by curve 80, wherein it may be seen that the frequency of acoustic waves/velocity (hz/feet per second) varies in accordance with the diameter of the cylindrical member. Each of the members 54–62 emits acoustic waves of differing natural frequencies.

After emitting vortices for a prescribed time, the cylindrical member 54 is rotated 90° back to the non-emit mode and simultaneously the cylindrical element 56 is rotated 90° to the emit mode. Cylindrical member 56 continues to emit acoustic waves for the prescribed time, while the remaining cylindrical elements are in the non-emit mode. Cylindrical member 56 is then rotated back to the illustrated position to the non-emit mode, while the cylindrical member 58 is rotated to a position wherein the passageways therethrough are oblique to the direction of towing in order to emit acoustic energy. This sequence continues until all the cylindrical members have been rotated to the emit mode and have generated acoustic signals for the prescribed intervals. As an example, assuming a total emit period of 7 seconds, each of the members would emit 1.4 seconds each. After 7 seconds, each of the cylindrical members remains in the non-emit mode for seven seconds to provide a listening period. The emit cycle is then again repeated as the vessel continues at a constant speed through the water.

The power generated by the source shown in FIG. 10 may be estimated from the equation:

$$P = \tfrac{1}{2}[\rho V^3 DL] \qquad (3)$$

wherein $\rho$ = water density $V$ = speed of the source relative to the water, $D$ = diameter of the cylindrical member, and $L$ = length of the cylindrical member.

Figure 12:
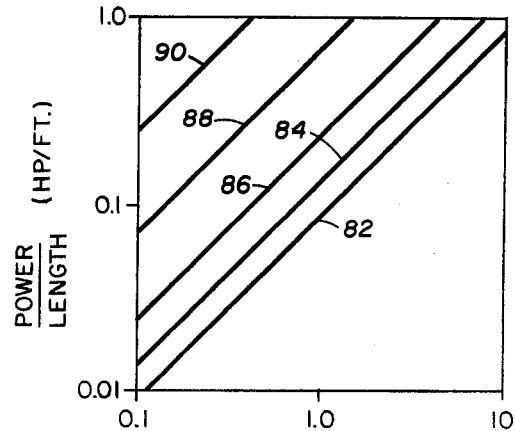
FIG. 12 is a graph illustrating the variance of the power generated by the present sources as a function of towing speed and dimensions.

Equation (3) is plotted in FIG. 12 for various towing boat speeds. For instance, the curve 82 is plotted for a boat speed of 5 knots, while curve 84 is provided for a boat speed of 6 knots. Curve 86 is plotted for a boat speed of 7 knots, curve 88 is plotted for a boat speed of 10 knots and curve 90 is plotted for a boat speed of 15 knots. FIG. 12 illustrates that the power/length (horsepower/feet) of the generating members vary in response to boat speed and in response to the diameter of the generating element.

It may be inferred from equation (3) that the source shown in FIG. 10 has a decreasing power spectrum, i.e. $P \propto 1/f$. Utilizing the curves plotted in FIGS. 11 and 12, a source similar to that shown in FIG. 10 may be sized to provide a power spectrum approximately flat between 10 and 30Hz and having an output equivalent to the large seismic vibrating units known in the trade as Vibroseis units. Table I provides the size of the elements and number of each element required to provide such a source.

TABLE I

| Fund. Freq. (Hz) | Diameter (in.) | Length (ft) | No. Required |
| --- | --- | --- | --- |
| 10 | 7.95 | 7 | 2 |
| 15 | 5.30 | 7 | 3 |
| 20 | 3.97 | 7 | 4 |
| 25 | 3.18 | 7 | 5 |
| 30 | 2.65 | 7 | 6 |

Figure 13:
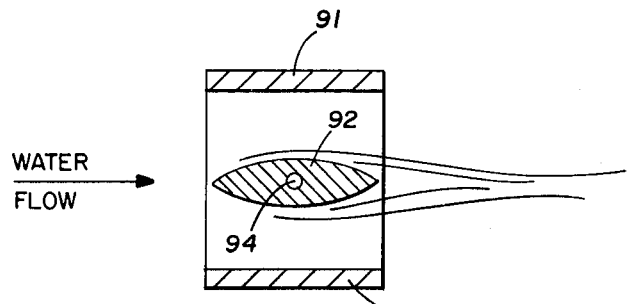
FIG. 13 is a side sectional view of a second embodiment of the invention in a non-emit mode.
Figure 14:
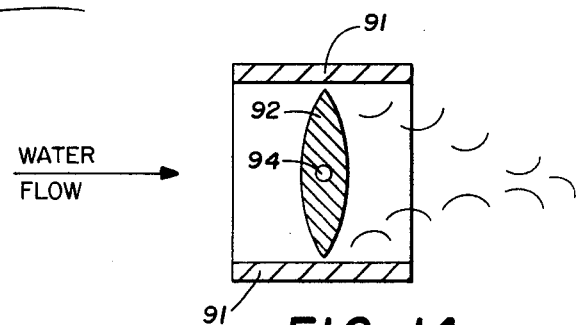
FIG. 14 is a side sectional view of the apparatus shown in FIG. 13 in the emit mode.

FIGS. 13 and 14 illustrate another embodiment of the invention, in which it is not necessary to provide water passageways through the emitting member. The source comprises a generally rectangular rigid housing 91 generally similar to the housing construction previously disclosed. Housing 91 is towed through the water by suitable tow cable structure similar to that previously described, not shown for ease of illustration. An element 92 having the illustrated cross section is pivotally mounted in the housing 91. Element 92 generally has a length of at least several feet and is connected to a motor, not shown, which is selectively operable to rotate the element 92 about its longitudinal axis 94.

In the non-emit mode shown in FIG. 13, the element 92 is positioned with its surfaces generally parallel to the direction of towing and to the direction of water flow. Due to the streamlined nature of the cross section of the element 92, little resistance is afforded to the water flow and substantially no acoustic waves of useful magnitude are generated by the passage of the device through the water. However, as shown in FIG. 14, when it is desired to generate acoustic waves, the motor is energized in a manner previously described in order to rotate the element 92 to a position wherein it is oblique to the direction of water flow. The element 92 then presents substantial resistance to the flow of water through the housing 91, thereby causing a severe discontinuity in the velocity profile of the water flowing through the housing 91. The resulting pressure gradient on the rear of the element 92 causes vortices to be alternately shed from the upper and lower portions of the element 92 in the manner illustrated. These vortices act on the body and create acoustic waves of a frequency dependent upon the dimensions of the element 92.

As the power output is a strong function of water flow velocity in the devices shown in FIGS. 13 and 14, and in the other devices previously described, it may be desirable in some instances to dispose a converging nozzle in front of the rotatable elements of the various sources. The nozzle may be rigidly attached to the front of the housing in order to substantially increase the velocity of the water flowing through the source housing. The resulting increase in velocity would increase the power output of the sources. With the use of such a nozzle, it is important that the pressure drop in the nozzle does not exceed the stagnation pressure of the source, which is given by $\frac{1}{2}[\rho V^2]$.

A plurality of sources similar to that shown in FIGS. 13 and 14 may be constructed in tandem in the manner illustrated in FIG. 10, or may be spaced along the length of the tow rope, provided the spacing is at least about 2-½ diameters. It will also be understood that various members of different cross sectional shapes may be constructed to provide acoustic waves of different shape and frequency characteristics.

FIG. 15 illustrates another embodiment of the invention, wherein a marine vessel 100 includes a reel 102 driven by a suitable motor 104. A tow cable 106 is wound on the reel 102 and extends downwardly into the water and is attached at the end thereof to a seismic source 108 constructed in accordance with the present invention. A suitable hydrophone system streamer 110 is also towed by the vessel 100.

The source 108 may comprise any of the sources previously described, or alternatively may comprise only a sealed cylinder attached at both ends to the tow cable. It has been found that varying the speed of travel of the source 108 through the water varies the frequency of acoustic waves generated thereby. In operation of the source, the motor 104 is selectively energized to sequentially reel the cable 106 in at a prescribed speed and then to reel the cable 106 out to thereby vary the speed of travel of the source 108. When the motor 104 is thus operated to vary the speed of the source 108, the vessel 100 is maintained on course at a constant speed.

FIGS. 16a–b illustrate operation of the embodiment shown in FIG. 15. Between the time interval $t_0$–$t_1$, the velocity of the source is increased as a ramp function, that is, the source is reeled toward the boat, and the frequency of the acoustic waves generated thereby increases as a ramp function. During the listening period $t_1$–$t_2$, the source 108 is reeled out. Beginning at $t_2$, the next acoustic generation cycle is initiated and the towing velocity of the source 108 is increased to thereby again increase the frequency of waves generated according to the illustrated ramp function. By suitably varying the speed at which the motor 104 is operated, various other output frequency characteristics may be generated. Additionally, a variety of frequency response curves may be generated with the use of the selectively energizable sources illustrated in the previous FIGURES.

FIGS. 17 and 18 illustrate another embodiment of the invention wherein the dimensional size of the seismic source may be selectively varied in order to vary the frequency of the acoustic waves. The source comprises an upper semi-circular portion 120 and a lower semi-circular portion 122. In the preferred embodiment, each of the semi-circular portions are sealed from water intrusion by construction from sheet metal, and are neutrally buoyant. The source is towed by tow lines 124 attached to a tow cable 126. Portions 120 and 122 are hingedly connected together at an elongated hinge portion 128. Suitable electric motors 130 and 132 are connected between the semicircular portions 120 and 122 as illustrated. The motors include worm gear output shafts for selective retention or extraction of the output shafts upon energization of the motors. Alternatively, in place of the motors 130 and 132, suitable electrically actuated solenoids may be provided between the unhinged edges of the portions 120 and 122 in order to allow selective movement of the portions 120 and 122 to or from each other.

According to FIG. 17, when the worm gear output shafts are generally retracted, the portions 120 and 122 are essentially closed upon one another to effectively provide a cylinder to the water flow upon towing thereof. As previously described, the passage of the cylinder through the water will tend to cause vortices which generate acoustic waves having a fundamental frequency according to equation (1). When the motors 130 and 132 are selectively energized from onboard the towing vessel, the worm gear shafts are extended outwardly to pivot the portions 120 and 122 about the hinge 128 to the position shown in FIG. 18. The effective diameter of the body passing through the water will thus be increased and acoustic waves of a different frequency will be generated due to the dependence of equation (1) upon the diameter of the source. Various frequency characteristics of the acoustic wave may be selectively generated upon actuation of the motors 130 and 132.

FIGS. 19a–d illustrate the variation of the frequency of generated acoustic waves according to the invention in dependence upon the effective diameter of the source. Referring to FIG. 19b, if the source is moved from the position shown in FIG. 18 to the position shown in FIG. 17, and then back again, the effective diameter of the source will linearly decrease and then linearly increase. The effective frequency of the generated acoustic waves will correspondingly increase and then decrease as illustrated. In this embodiment, the source emits continuously and the resulting data is recorded continuously, in the manner disclosed in U. S. Pat. No. 3,413,596 by Backus et al.

While the sources of the present invention have been described as being towed underwater by a tow line, it will be understood that the sources may be towed underwater by being directly connected to the submerged portion of a vessel's hull, or in some embodiments, resiliently connected to the towing vessel.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for generating underwater acoustic waves comprising:
   a structural body for being towed through water, and
   means for varying the physical orientation of said body with respect to the line of towing between a first mode wherein a relatively sharp discontinuity occurs in the velocity of water passing over said structural body and a second mode wherein the relatively sharp discontinuity is reduced.

2. A system for generating underwater acoustic waves comprising
   a structural body for being towed through water, and
   means for varying the degree of resiliency of said body between a first mode wherein a relatively sharp discontinuity occurs in the velocity of water passing over said structural body and a second mode wherein the relatively sharp discontinuity is reduced.

3. Apparatus for generating acoustic waves for marine seismic exploration comprising:
   a structural body for being towed through water by a marine vessel,
   means defining passageways through said body, and
   means for varying the orientation of said passageways with respect to the direction of towing of said body, wherein substantially no acoustic waves are generated when said passageways are generally parallel to the direction of towing and wherein acoustic waves of sufficient magnitude for seismic exploration are generated when said passageways are obliquely disposed with respect to the direction of towing.

4. The method of claim 3 and further comprising:
   an outer housing generally enclosing said structural body, and
   means attached to said housing for moving said structural body relative to said housing for varying the orientation of said passageways.

5. The apparatus of claim 4 wherein said structural body is generally circular and includes said passageways therethrough, motor means attached to said housing for rotating said body between a right angle.

6. The apparatus of claim 4 and further comprising:
   resilient means interconnecting said structural body and said housing.

7. The apparatus of claim 6 wherein said resilient means is remotely adjustable in order to vary the frequency of the generated acoustic waves.

8. The apparatus of claim 4 and further comprising:
   a plurality of said structural bodies enclosed by said housing, each body selectively movable and operable to generate an acoustic wave of a different power and frequency content.

9. The method for generating acoustic waves comprising:
   towing a body underwater, and
   changing the physical orientation of the body with respect to the line of towing to provide a plurality of different operational modes, said operational modes being characterized by different magnitudes of velocity discontinuities created in the water passing over said body due to the towing of said body therethrough.

10. The method for generating acoustic waves comprising:
    towing a body underwater, and
    changing the degree of resiliency of the body to provide a plurality of different operational modes, said operational modes being characterized by different magnitudes of velocity discontinuities created in the water passing over said body due to the towing of said body therethrough.

11. The method for generating acoustic waves comprising:
   towing a body underwater, and
   changing the dimensional size of the body to provide a plurality of different operational modes, said operational modes being characterized by different magnitudes of velocity discontinuities created in the water passing over said body due to the towing of said body therethrough.

12. The method of generating acoustic waves for marine seismic exploration comprising:
   towing a body with fluid passageways underwater, and
   varying the orientation of the fluid passageways with respect to the direction of towing, whereby acoustic waves suitable for seismic exploration are generated by the creation of velocity discontinuities in the water when said passageways are obliquely disposed to the direction of towing.

13. The method of claim 12 wherein said step of varying comprises:
   rotating the body around its longitudinal axis about a predetermined angle.

14. The method of claim 12 and further comprising:
   varying the resiliency of resilient mounting structure for the body.

15. The method of generating acoustic waves for marine seismic exploration comprising:
   towing a body underwater, said body creating velocity discontinuities in the water passing thereby to create acoustic waves, and
   varying the towing speed of said body according to a predetermined program for varying the frequency and wavelength of the acoustic waves.

16. The method of claim 15 wherein the towing speed is varied by selectively reeling the towing cable attached to said body.

* * * * *